(12) United States Patent
Park et al.

(10) Patent No.: US 12,684,448 B2
(45) Date of Patent: Jul. 14, 2026

(54) METHOD AND APPARATUS FOR MANAGING SERVICE AREA FOR UE IN WIRELESS COMMUNICATION SYSTEM

(71) Applicant: Samsung Electronics Co., Ltd., Gyeonggi-do (KR)

(72) Inventors: Jungshin Park, Gyeonggi-do (KR); Dongyeon Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 331 days.

(21) Appl. No.: 18/363,263

(22) Filed: Aug. 1, 2023

(65) Prior Publication Data

US 2024/0040465 A1 Feb. 1, 2024

(30) Foreign Application Priority Data

Aug. 1, 2022 (KR) ........................ 10-2022-0095538

(51) Int. Cl.
*H04W 36/00* (2009.01)
*H04W 36/18* (2009.01)
*H04W 36/32* (2009.01)

(52) U.S. Cl.
CPC ..... *H04W 36/324* (2023.05); *H04W 36/0061* (2013.01); *H04W 36/008355* (2023.05); *H04W 36/18* (2013.01)

(58) Field of Classification Search
CPC ....... H04W 36/324; H04W 36/008355; H04W 36/18; H04W 36/0061
See application file for complete search history.

(56) References Cited

U.S. PATENT DOCUMENTS

2021/0065566 A1 3/2021 Li et al.
2021/0076202 A1 3/2021 Park et al.
(Continued)

FOREIGN PATENT DOCUMENTS

EP 3 846 543 7/2021
JP 2020067881 A * 4/2020
(Continued)

OTHER PUBLICATIONS

International Search Report dated Oct. 27, 2023 issued in counterpart application No. PCT/KR2023/011239, 6 pages.
(Continued)

*Primary Examiner* — Khai M Nguyen
(74) *Attorney, Agent, or Firm* — The Farrell Law Firm, P.C.

(57) ABSTRACT

The disclosure relates to a 5G or 6G communication system for supporting a higher data transmission rate. Disclosed are a method and an apparatus for allocating a service area for a flyable user equipment (UE) in a wireless communication system and enabling a handover to a base station capable of aviation communication when the UE is moved to provide the UE with a seamless service. A method performed by an access and mobility management function (AMF) in a wireless communication system may include receiving, from an unmanned aerial system (UAS) service supplier (USS), flight-related information about a UE; determining at least one candidate base station to be used by the UE, based on the flight-related information about the UE; transmitting, to the at least one candidate base station, a request message for requesting aviation communication-related information about the at least one candidate base station; receiving, from the at least one candidate base station, a response message including aviation communication-related information about the at least one candidate base station; and generating
(Continued)

START

RECEIVE FLIGHT-RELATED INFORMATION ABOUT UE ~810

DETERMINE AT LEAST ONE CANDIDATE BASE STATION TO BE USED BY UE ~820

REQUEST AVIATION COMMUNICATION-RELATED INFORMATION TO AT LEAST ONE CANDIDATE BASE STATION ~830

RECEIVE AVIATION COMMUNICATION-RELATED INFORMATION ABOUT AT LEAST ONE CANDIDATE BASE STATION FROM AT LEAST ONE CANDIDATE BASE STATION ~840

GENERATE HANDOVER LIST TO BE USED BY UE, BASED ON FLIGHT-RELATED INFORMATION ABOUT UE AND AVIATION COMMUNICATION-RELATED INFORMATION ABOUT AT LEAST ONE CANDIDATE BASE STATION ~850

END a handover list to be used by the UE, based on the flight-related information about the UE and the aviation communication-related information about the at least one candidate base station.

15 Claims, 6 Drawing Sheets

(56)                    References Cited

U.S. PATENT DOCUMENTS

| | | | | |
|---|---|---|---|---|
| 2021/0295713 A1* | 9/2021 | Hong | ..................... | G08G 5/26 |
| 2021/0331799 A1 | 10/2021 | Hong | | |
| 2022/0312205 A1* | 9/2022 | Park | ................... | H04B 7/18506 |
| 2023/0397155 A1* | 12/2023 | Ryu | ................... | H04W 12/082 |

FOREIGN PATENT DOCUMENTS

| | | |
|---|---|---|
| WO | WO 2019/133049 | 7/2019 |
| WO | WO 2020/149650 | 7/2020 |
| WO | WO 2022/032165 | 2/2022 |
| WO | WO 2022/132479 | 6/2022 |

OTHER PUBLICATIONS

European Search Report dated Oct. 23, 2025 issued in counterpart application No. 23850396.5-1218, 9 pages.

* cited by examiner

METHOD AND APPARATUS FOR MANAGING SERVICE AREA FOR UE IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0095538, filed on Aug. 1, 2022, in the Korean Intellectual Property Office, the disclosure of which is incorporated herein by reference in its entirety.

BACKGROUND

1. Field

The disclosure relates to a method and an apparatus for allocating and managing a service area for a user equipment (UE) in a wireless communication system, and for providing an aviation communication service for a UE in a wireless communication system.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as an LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum, and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

As various services may be provided due to the development of mobile communication systems as described above, a service for a flight-related UE, such as an uncrewed (unmanned) aerial service (UAS) as one of important services, is attracting attention, and a need for a technique for efficiently designating and managing a UAS service area for a UE is raised due to different characteristics from those of ground communication.

SUMMARY

The disclosure provides a method and an apparatus for allocating and controlling a service area for a UE in a wireless communication system.

The disclosure also provides a method and an apparatus for controlling signal flow between a UE and network function (NF) entities to allocate and manage a service area for the UE using a UAS service in a wireless communication system.

According to the disclosure, a wireless communication system may identify an aviation communication-enabled cell, thereby controlling a handover (HO) of a UE.

According to an embodiment, a method performed by an access and mobility management function (AMF) in a wireless communication system may include receiving flight-related information about a user equipment (UE) from an unmanned aerial system (UAS) service supplier (USS); determining at least one candidate base station to be used by the UE, based on the flight-related information about the UE; transmitting a request message for requesting aviation communication-related information to the at least one candidate base station; receiving a response message including aviation communication-related information about the at least one candidate base station from the base station; and generating a handover list to be used by the UE, based on the flight-related information about the UE and the aviation communication-related information about the base station.

According to an embodiment, a method performed by a base station in a wireless communication system may include receiving a request message for requesting aviation communication-related information from an access and mobility management function (AMF); transmitting a response message including aviation communication-related information about the base station to the AMF; and receiving, from the AMF, a handover list to be used by a user equipment (UE) that is generated based on the aviation communication-related information about the base station and flight-related information about the UE.

According to an embodiment, an access and mobility management function (AMF) entity in a wireless communication system may include a transceiver; and at least one processor configured to receive, from an unmanned aerial system (UAS) service supplier (USS) entity, flight-related information about a user equipment (UE), determine at least one candidate base station to be used by the UE based on flight-related information about the UE, transmit to the at least one candidate base station a request message for requesting aviation communication-related information about the at least one candidate base station, receive from the at least one candidate base station a response message including aviation communication-related information about the at least one candidate base station, and generate a handover list to be used by the UE based on the flight-related information about the UE and the aviation communication-related information about the at least one candidate base station.

According to an embodiment, a base station in a wireless communication system may include a transceiver; and at least one processor configured to receive from an access and mobility management function (AMF) entity a request message for requesting aviation communication-related information, transmit to the AMF entity a response message including aviation communication-related information about the base station, and receive from the AMF entity a handover list to be used by a user equipment (UE) that is generated based on the aviation communication-related information about the base station and flight-related information about the UE.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
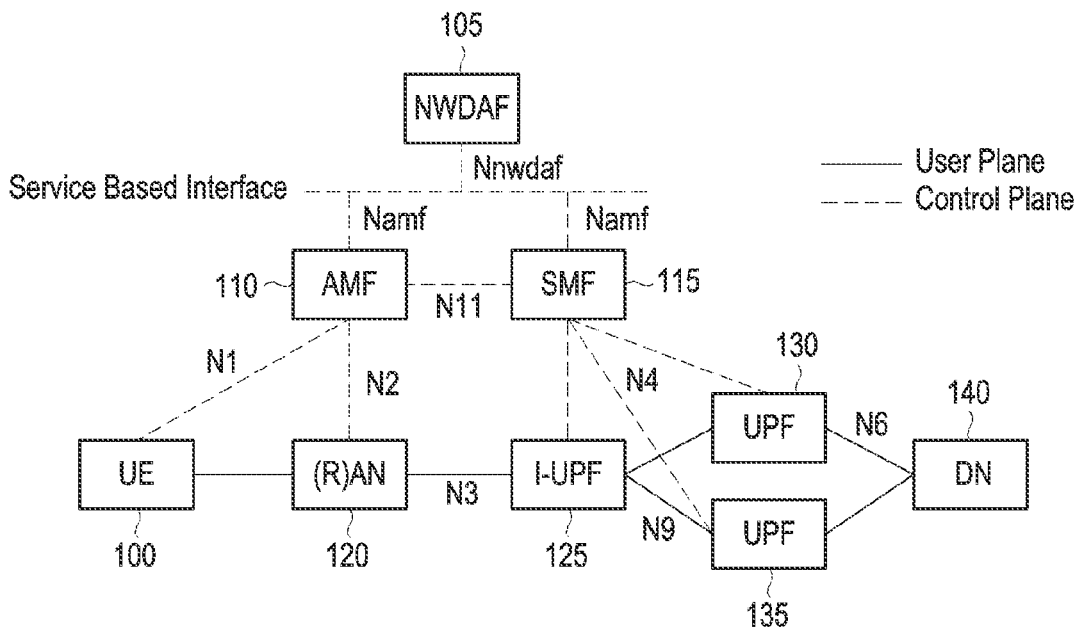
FIG. 1 illustrates a configuration of a wireless communication network according to an embodiment.

Hereinafter, embodiments of the disclosure will be described in detail in conjunction with the accompanying drawings.

In describing embodiments of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not necessarily reflect its actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the scope of protection of the disclosure is defined only by the scope of the appended claims.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions executed on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, "unit" does not always have a meaning limited to software or hardware. The "unit" may be constructed either to be stored in an addressable storage medium or to execute one or more processors. Therefore, the term "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" may be implemented to reproduce one or more CPUs within a device or a security multimedia card. Furthermore, the "unit" in the embodiments may include one or more processors.

In the following description, some of terms and names defined in the 3rd generation partnership project long term evolution (3GPP LTE)-based standards (e.g., standards for 5G, NR, LTE, or similar systems) may be used for the sake of descriptive convenience. However, the disclosure is not limited by these terms and names, and may be applied in the same way to systems that conform to other standards.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

The following detailed description of embodiments of the disclosure is mainly directed to new radio radio access network (NR RAN) and packet core as a core network (5G system, 5G core network, or new generation core (NG Core)) which are specified in the 5G mobile communication standards defined by the 3rd generation partnership project long term evolution (3GPP LTE) that is a mobile communication standardization group, but based on determinations by those skilled in the art, the main idea of the disclosure may be applied to other communication systems having similar backgrounds or channel types through some modifications without significantly departing from the scope of the disclosure.

In a 5G system, a network data collection and analysis function (NWDAF), which is a network function that provides a function of analyzing and providing data collected in a 5G network, may be defined to support network automation. The NWDAF may collect/store/analyze information from the 5G network to provide a result to at least one network function (NF), and each NF may independently use an analysis result.

A 5G mobile communication system supports NFs in using a result of collecting and analyzing network-related data (hereinafter, referred to as network data) through the NWDAF, which is for providing collection and analysis of network data necessary for each NF to effectively provide functions provided by each NF in a centralized form. The NWDAF may collect and analyze network data by a basic unit of a network slice. However, the scope of the disclosure is not limited to the unit of the network slice, and the NWDAF may additionally analyze various pieces of information (e.g., quality of service (QoS)) obtained from a user equipment (UE), a protocol data unit (PDU) session, an NF state and/or an external service server.

An analysis result from the NWDAF may be forwarded to each NF having requested the analysis result, and the forwarded analysis result may be used to optimize network management functions, such as guarantee/improvement of QoS, traffic control, mobility management, and load balancing.

A unit node that performs each function provided by the 5G network system may be defined as an NF (or referred to as an NF entity or an NF node). Each NF may include, for example, at least one of an access and mobility management function (AMF) that manages access and mobility of a UE to an access network (AN), a session management function (SMF) that performs session-related management, a user plane function (UPF) that manages a user data plane, and a network slice selection function (NSSF) that selects a network slice instance available to a UE.

FIG. 1 illustrates a configuration of a wireless communication network according to an embodiment.

Referring to FIG. 1, an NWDAF 105 may collect network data from at least one source NF, for example, NFs in a 5G core network including an AMF 110, an SMF 115, an I-UPF 125, or UPFs 130, and 135, an application function (AF) for efficiently providing a service, a network exposure function (NEF), or an operation, administration, and maintenance (OAM), in various manners. The AMF 110 may be connected to a user equipment (UE) 100 and a radio access network (RAN) 120, and the I-UPF (Intermediate-UPF) 125, and the UPFs 130, and 135 may connect user traffic of the UE 100 through the RAN 120 to at least one data network (DN) 140.

The NWDAF 105 may provide analysis of network data collected from the network or the outside for at least one consumer NF. The NWDAF 105 may collect and analyze a load level of a network slice instance, and may provide the same to an NSSF to use the same in selecting a network slice to be used for a specific UE. A service-based interface defined in a 5G network may be used to request analysis information or transmit the analysis information including an analysis result between the NFs 110 and 115 and the NWDAF 105, and as a forwarding method, for example, a hypertext transfer protocol (HTTP) and/or a JavaScript object notation (JSON) document may be used.

The data collected by the NWDAF 105 may include, for example, at least one of an application identifier (ID) from a point coordination function (PCF), IP filter information, a media/application bandwidth, a UE ID from the AMF, location information, a destination data network name (DNN) from the SMF, a UE IP, a QoS flow bit rate, a QoS flow ID (QFI), a QoS flow error rate, QoS flow delay, or a traffic usage report from the UPFs.

Further, the NWDAF 105 may additionally collect, for example, at least one of an NF resource status, an NF throughput, service level agreement (SLA) information, a UE status from the UE, UE application information, a UE usage pattern, an application ID of a service provided from the AF, service experience, or a traffic pattern from the OAM, which is an entity that may affect a connection between the UE and a service server, in addition to the NFs forming the core network, and may use the same for analysis.

Table 1 to Table 3 below show examples of the network data collected by the NWDAF 105. A period and a time in which the NWDAF collects network data from each entity may vary by each entity. In addition, a correlation between collected data may be distinguished through a correlation ID for correlating data to be collected and a timestamp for recording a collection time.

TABLE 1

| Information | Source | Description |
|---|---|---|
| Application ID | AF | To identify the service and support analytics per type of service (the desired level of service). |
| IP filter information | AF | Identify a service flow of the UE for the application |
| Locations of Application | AF/ NEF | Locations of application represented by a list of DNAI(s) (Data Network Access Identifiers). The NEF may map the AF-Service-Identifier information to a list of DNAI(s) when the DNAI(s) being used by the application are statically defined. |
| Service Experience | AF | Refers to the QoE (Quality of Experience) per service flow as established in the SLA and during on boarding. It can be either e.g. MOS (Mean Opinion Score) or video MOS as specified in ITU-T P.1203.3 or a customized MOS. |
| Timestamp | AF | A time stamp associated to the service experience provided by the AF, mandatory if the Service experience is provided by the ASP (Application Service Provider). |

TABLE 2

| Information | Source | Description |
|---|---|---|
| Timestamp | 5GC NF | A time stamp associated with the collected information. |
| Location | AMF | The UE location information. |
| SUPI(s) (Subscription Permanent Identifiers) | AMF | If UE IDs are not provided as target of analytics reporting for slice service experience, AMF returns the UE IDs matching the AMF event filters. |
| DNN | SMF | DNN for the PDU Session which contains the QoS flow |
| S-NSSAI | SMF | S-NSSAI for the PDU Session which contains |

TABLE 2-continued

| Information | Source | Description |
|---|---|---|
| (Single - Network Slice Selection Assistance Information) | | the QoS flow |
| Application ID | SMF | Used by NWDAF to identify the application service provider and application for the QoS flow |
| IP filter information | SMF | Provided by the SMF, which is used by NWDAF to identify the service data flow for policy control and/or differentiated charging for the QoS flow |
| QFI | SMF | QoS Flow Identifier |
| QoS flow Bit Rate | UPF | The observed bit rate for uplink (UL) direction; and the observed bit rate for downlink (DL) direction |
| QoS flow Packet Delay | UPF | The observed packet delay for UL direction; and the observed packet delay for the DL direction |
| Packet transmission | UPF | The observed number of packet transmission |
| Packet retransmission | UPF | The observed number of packet retransmission |

TABLE 3

| Information | Source | Description |
|---|---|---|
| Timestamp | OAM | A time stamp associated with the collected information. |
| Reference Signal Received Power (RSRP) | OAM | The per UE measurement of the received power level in a network cell, including SS (Synchronization Signal)-RSRP, CSI (Channel State Information)-RSRP as specified in clause 5.5 of TS 38.331 and E-UTRA (Evolved Universal Terrestrial Radio Access) RSRP as specified in clause 5.5.5 of TS 36.331 |
| Reference Signal Received Quality (RSRQ) | OAM | The per UE measurement of the received quality in a network cell, including SS-RSRQ, CSI-RSRQ as specified in clause 5.5 of TS 38.331 and E-UTRA RSRQ as specified in clause 5.5.5 of TS 36.331 |
| Signal-to-noise and interference ratio (SINR) | OAM | The per UE measurement of the received signal to noise and interference ratio in a network cell, including SS-SINR, CSI-SINR, E-UTRA RS-SINR, as specified in clause 5.1 of TS 38.215 |

Hereinafter, for convenience of description, certain embodiments of the disclosure will be described with reference to a UAS service, which is one of aviation-related services, for illustration purposes. However, it is apparent to those skilled in the art that the embodiments of the disclosure are also applicable to other types of aviation-related services, for example, aviation-related services for a manned aviation terminal without being limited to the UAS service.

Figure 2:
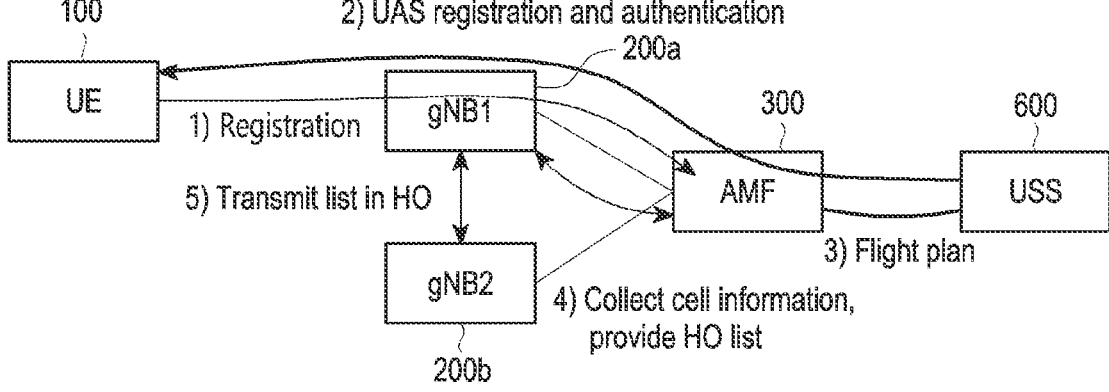
FIG. 2 illustrates an operation of a UE receiving service area information through a wireless communication system according to an embodiment.

FIG. 2 illustrates an operation of a UE receiving service area information through a wireless communication system according to an embodiment.

Referring to FIG. 2, in stage 1, the UE 100 may perform a registration procedure with a wireless communication system to initiate a wireless communication service. An AMF 300 may receive information about a subscription of the UE 100 to the wireless communication system from a unified data management (UDM) in a series of initial configuration processes for processing a registration request of the UE 100. The information about the subscription of the UE received from the UDM may include information indicating whether the UE 100 is a UE that needs aviation communication to use a UAS service. When the UE is identified as a UE that needs aviation communication to use a UAS service from the information about the subscription of the UE, the AMF 300 may transmit information indicating that the UE additionally performs a UAS service authentication process after completing an initial registration process to the UE in a response process to the registration request of the UE.

In stage 2, the UE 100 may perform a procedure for registering and authenticating the UAS service with a UAS service supplier (USS) 600 according to an indication from the wireless communication system after completing initial registration with the wireless communication system.

In stage 3, when completing authentication of the UAS service with the UE 100, the USS 600 may transmit an authentication result the wireless communication system so that the wireless communication system may use the authentication result for managing the UAS service of the UE. In this process, the USS 600 may transmit flight plan information about the UE along with the authentication result to the wireless communication system. The flight plan information about the UE may include key information related to a flight, such as flight departure and arrival points, estimated aviation communication start and end times, an estimated flight path and altitude, an estimated flight speed, and a major pass point and estimated passage time.

In stage 4, the AMF 300 may collect information about whether each base station 200a and 200b is capable of supporting aviation communication and information about cells capable of supporting aviation communication from each base station located on a path on which the UE may travel, based on the flight plan information received from the USS 600. When the flight plan information about the UE includes information about the estimated flight path and altitude, the AMF 300 may transmit a request for collecting information about whether each candidate base station capable of supporting radio communication in areas forming the path is capable of supporting aviation communication and information about cells capable of supporting aviation communication only to the candidate base station by using the information about the estimated flight path and altitude. It is also determined whether each base station and cell support aviation communication may be configured differently even between base stations belonging to the same tracking area or between different cells of the same base station according to a configuration of the wireless communication system of an operator, and may be frequently changed in view of a traffic amount related to aviation communication as needed by the operator.

The AMF 300 may select base stations to support aviation communication at respective points of an estimated traveling path of the UE by using the information about whether each base station is capable of supporting aviation communication and the information about the cells capable of supporting aviation communication received from each base station, and may generate a handover (HO) list of the base stations.

The AMF 300 may transmit the generated handover list to a base station 200a with which the UE 100 is currently communicating, and may perform control to hand over the UE 100 to a base station supporting aviation communication according to the traveling path of the UE, based on the handover list, when the UE 100 starts aviation communication.

In stage 5, information about the handover list may be transmitted between base stations through a handover control message in a process of changing a base station of the UE due to movement of the UE, and thus the UE may be handed over to cells capable of aviation communication, based on the handover list, until terminating the flight, thereby smoothly providing the UAS service to the UE. When needed, the AMF 300 may reconfigure and allocate a registration area (RA) allocated to the UE 100 to the UE 100 in view of the flight path of the UE and handover configuration information.

Figure 3:
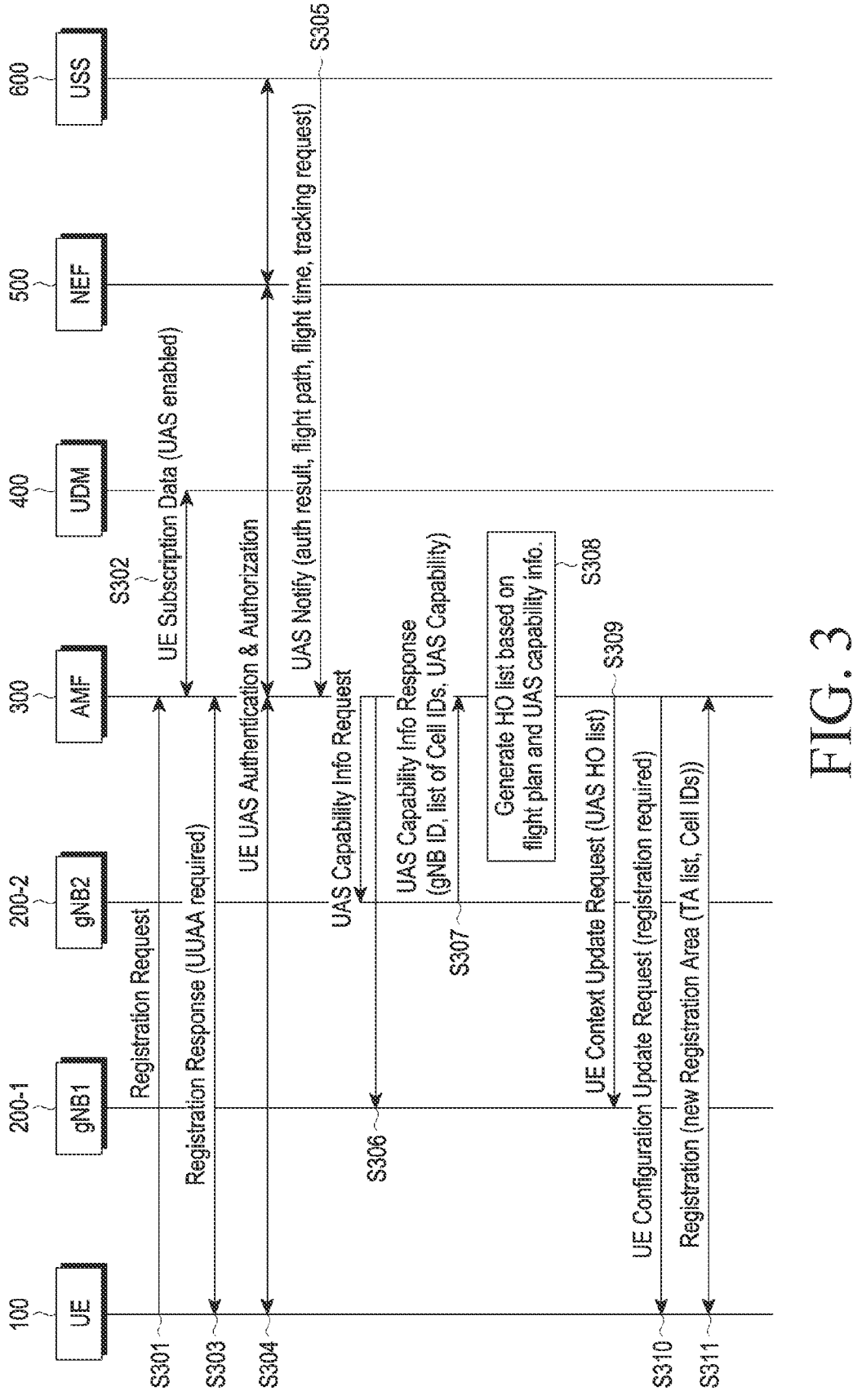
FIG. 3 is a signal flow diagram illustrating an operation between a UE and a network entity for designating a service area of the UE according to an embodiment.

FIG. 3 is a signal flow diagram illustrating an operation between a UE and a network entity for designating a service area of the UE according to an embodiment.

Referring to FIG. 3, in step S301, the UE 100 transmits a registration request message to an AMF 300 for initial access to a radio communication system. The UE 100 may include information indicating that the UE is a flyable UE supporting aviation communication in the registration request message.

In step S302, upon receiving the registration request message from the UE 100, the AMF 300 may request and receive subscription information about the UE from a UDM 400 to identify the subscription information. When the UE 100 is a flyable UE for which aviation communication is allowed, the subscription information about the UE may include an indicator (e.g., UAS-enabled) indicating that the UE is a UE for which a UAS service is allowed. That is, the subscription information may include information indicating whether the UE is capable of aviation communication. When identifying the UE as a UE capable of the UAS service, based on the indicator indicating that the UE is the UE supporting the UAS service included in the subscription information about the UE received from the UDM 400, the AMF 300 may determine that the UE 100 needs to perform a separate registration process for using the UAS service after performing an operation of registering in the radio communication system. Here, indicator information indicating that the UE 100 is the UE supporting aviation communication included in the registration request message may also be referred to.

That is, in an embodiment, when the registration request message does not include the indication information indicating that the UE is the UE supporting aviation communication, even though the subscription information about the UE received from the UDM 400 includes the indicator indicating that the UE is the UE supporting the UAS service, the AMF 300 may determine not to allow the UAS service for the UE, and may determine that the UE does not need to perform the separate registration process for using the UAS service after performing a process of registering in the radio communication system.

In step S303, the AMF 300 may transmit a registration response message to the UE. The registration response message may include information about an indicator (e.g., UUAA (UAV (Uncrewed Aerial Vehicle) USS (UAS (Uncrewed Aerial System) Service Supplier) Authentication and Authorization)-required) indicating that the UE 100 needs to perform a registration and authentication process for using the UAS service.

In step S304, the UE 100 may perform the registration and authentication process for using the UAS service with a USS 600 through the radio communication system (e.g., the AMF 300). According to an embodiment, the registration and authentication process may be performed immediately after the UE receives the registration response message from the AMF, or be performed during a process in which the UE generates a PDU session to initiate the UAS service. When performing the registration and authentication process for using the UAS service, the UE 100 may transmit flight plan information about the UE to the USS 600, and the flight plan information may include key information related to a flight which the USS allows for the UE, such as location information about flight departure and arrival points, estimated aviation communication start and end times, an estimated flight path and altitude, an estimated flight speed (or velocity), and a major pass point and estimated passage time (point).

In step S305, the USS 600 may transmit a UAS service authentication result of the UE to the radio communication system (e.g., the AMF 300) after performing registration and authentication of the UE for using the UAS service. Information transmitted from the USS 600 to the radio communication system may include not only the authentication result but also the flight plan information about the UE. The flight plan information may include at least one of the key information related to the flight which the USS allows for the UE, such as the location information about the flight departure and arrival points, the estimated aviation communication start and end times, the estimated flight path and altitude, the estimated flight speed (or velocity), and location information and the estimated passage time (point) relating to the major pass point. Further, information about whether the USS 600 requests the radio communication system (e.g., the AMF 300) to track and report the location of the UE to track the UE when the UE deviates from an allowed flight path may be also included in the information transmitted from the USS 600 to the AMF 300 and be transmitted to the radio communication system. The information may be transmitted to the AMF 300 via an NEF 500 through a UAS Notify message. In another embodiment, instead of the USS transmitting the flight plan information about the UE along with the service authentication result of the UE to the AMF, the USS may transmit only the service authentication result of the UE to the AMF, and the AMF having received the service authentication result may request and receive the flight plan information about the UE having succeeded in authentication from the USS.

In step S306, the AMF 300 may estimate a possible flight path pf the UE, based on the flight plan information received from the USS 600, and may select at least one base station that manages cells on the flight path and neighboring cells of the cells as at least one candidate base station (gNB1, gNB2) 200-1 and 200-2 that the UE is to use during the flight. The at least one candidate base station may include base station 200-1 to which the UE 100 is currently connected. The AMF 300 may transmit a message (e.g., a UAS Capability Info Request message) for requesting information about whether each cell of each of the selected at least one candidate base station 200-1 and 200-2 supports aviation communication to each candidate base station. When the estimated flight path of the UE is specified in the flight plan information about the UE received from the USS 600, the AMF 300 may select candidate base stations to be used for the UE to perform aviation communication during the flight, based on the estimated flight path.

In step S307, each selected candidate base station 200-1 and 200-2 may transmit a response message (e.g., a UAS Capability Info Response message) to the AMF 300 in response to a request of the AMF 300 in step S306. The response message may include information indicating whether each base station requested by the AMF 300 supports aviation communication, information indicating whether at least one cell of the base station supports aviation communication, identifier information about each base station, or identifier information about cells of the base station.

In step S308, the AMF 300 may extract identifier information about a base station or a cell to be used during the flight of the UE according to the estimated path, based on the information about whether each candidate base station or the cell of each base station supports aviation communication, the identifier information about each base station, or the identifier information about the cells of the base station received from each candidate base station 200-1 and 200-2, and may generate a handover list for the UAS service. The UAS handover list may be configured simply in a list including a pair of identifiers of a base station to be used during the flight of the UE and a cell of each base station depending an embodiment, or may be configured in a two-dimensional form in which a list of base stations is configured and available cell identifiers are designated for the respective base stations. The list may further include movement time information about the UE received from the USS with respect information about each base station. The list may be generated not only in the AMF but also in another network entity.

In step S309, the AMF 300 may transmit a message (e.g., a UE Context Update Request message) including the UAS handover list configured in step S308 to the base station 200-1 with which the UE 100 is currently communicating, and the currently communicating base station 200-1 receiving the message may preferentially select a base station included in the received UAS handover list as a target base station for a handover when selecting a candidate base station in a subsequent handover process of the UE 100, thus handing over the UE 100 to a base station and a cell capable of aviation communication. Further, the UAS handover list may be transmitted to the target base station through a handover request message transmitted from the currently communicating base station 200-1 to the target base station 200-2 in the subsequent handover process of the UE 100, thereby selecting a base station and a cell included in the handover list in a subsequent handover process according to movement of UE.

In step S310, the AMF 300 may determine to allocate the UE 100 a new registration area changed to include base stations included in the UAS handover list or some of the base stations in view of the UAS handover list. The AMF 300 may transmit a message (e.g., a UE Configuration Update Request Message) to the UE 100 to allocate the new registration area to the UE 100 so that the UE 100 performs a process for requesting registration in the new registration area.

In step S311, the UE 100 may perform the process for requesting the registration in the new registration area with the AMF 300, and the AMF 300 may transmit information about the newly configured registration area (or tracking area list), the UAS handover list, and the identifier information about the cells included in the UAS handover list to the UE 100 in a registration process.

Figure 4:
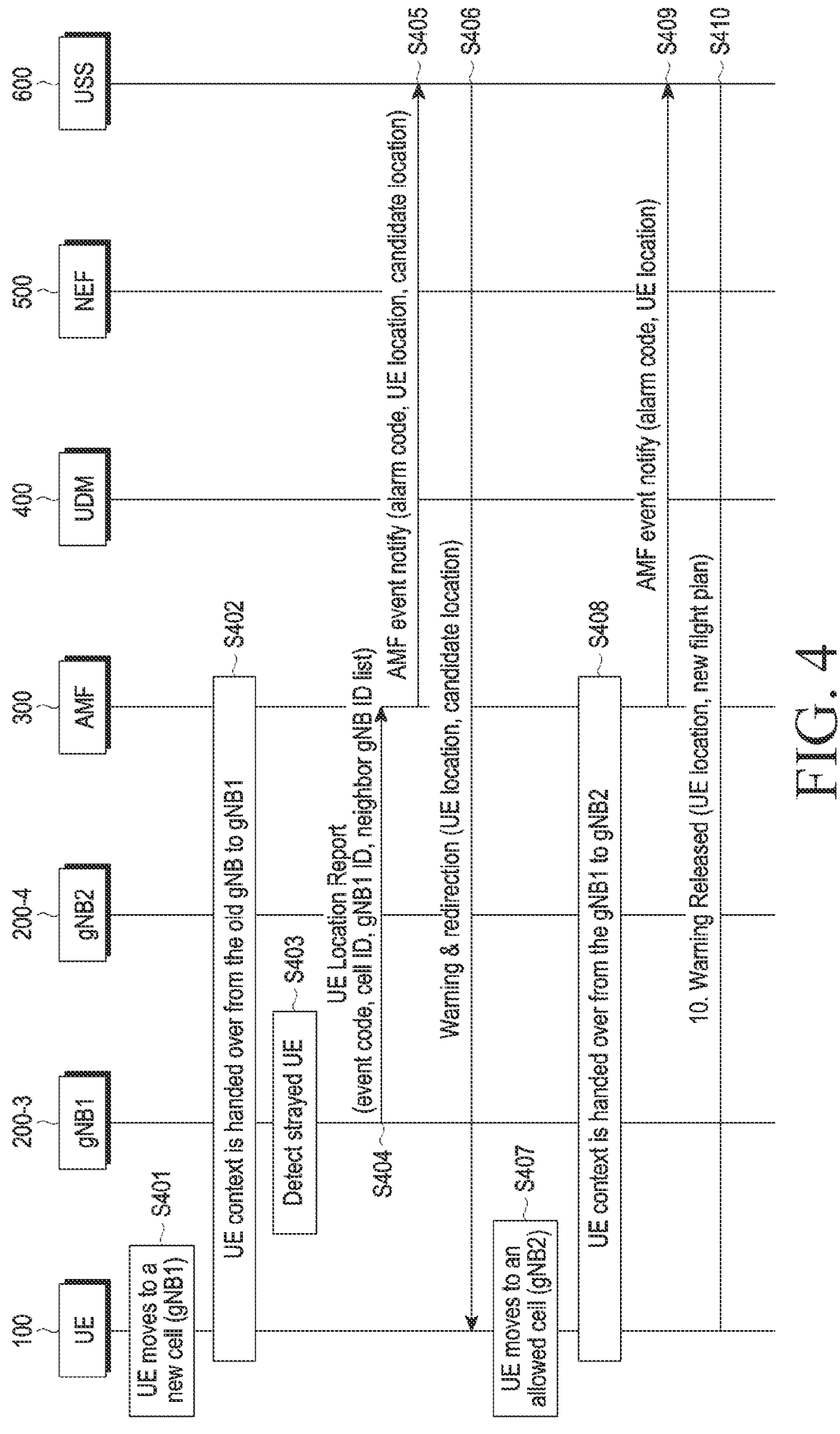
FIG. 4 is a signal flow diagram illustrating an operation of controlling a service for a UE in view of a handover list when the UE leaves a designated service area according to an embodiment.

FIG. 4 is a signal flow diagram illustrating an operation of controlling a service for a UE in view of a handover list when the UE leaves a designated service area according to an embodiment.

Referring to FIG. 4, in step S401, when the UE 100 moves while in aviation communication, the UE may randomly move to a cell not included in a flight plan and may access a gNB1 200-3, which may occur due to interference or a bad connection, operational abnormalities of the UE, or arbitrary manipulation during the communication, and the UE may move from an accessed cell to a random cell of the same base station not belonging to a UAS handover list without changing the base station.

In step S402, when the UE accesses the gNB1 200-3, which is a base station to which the UE has randomly moved, and requests communication, a radio communication system (e.g., an AMF 300) may perform an operation of requesting context of the UE from a previous base station and recovering a data transmission path of the UE according to a handover procedure.

In step S403, when the procedure of handing over the UE 100 to the base station gNB1 200-3 in step S402 is successfully performed, the UE 100 may be configured to a state in which communication is possible through the base station gNB1 200-3. The base station gNB1 200-3 may receive the UAS handover list from the previous base station in the procedure of handing over the UE. The base station gNB1 200-3 may identify from information of the received UAS handover list that the UE 100 has left the base station and cells designated by the radio communication system and has moved to an area of the current cell of the gNB1 200-3.

In step S404, the gNB1 200-3 may transmit a message (e.g., a UE Location Report message) to the AMF 300 to report to the AMF 300 that the UE 100 has left a designated UAS service area and moved to the arbitrary area. The message may include event code information indicating departure of the UE, identifier information about the cell currently accessed by the UE, identifier information about the reporting base station, and identifier list information about a base station or cell including a cell included in the UAS handover list among neighboring base stations of the reporting base station.

In step S405, the AMF 300 may transmit a message (e.g., an AMF event notify message) for transmitting information related to the departure of the UE to a USS 600, based on the information received from the base station 200-3. The message may include alarm code information indicating departure of the UE from an estimated service area, current location information about the UE, information about a candidate location to which the UE is expected to move, or information about an allowed location to which the UE needs to move. The current location information about the UE may be configured to geographical location information corresponding to the identifier information about the cell currently accessed by the UE received from the base station, and the information about the candidate location to which the UE is expected to move may be configured to geographical location information corresponding to the identifier information about the base station or cell including the cell included in UAS handover list among the neighboring base stations received from the base station.

In step S406, the USS 600 may transmit a warning message (e.g., a Warning & Redirection message) to the UE to report that the UE 100 has deviated from a flight path and to request correction of the flight path. The message may include the information related to the current location of the UE and the allowed location to which the UE needs to move for reference of the UE 100 in the correction of the flight path, and may be configured as a simple warning form or a command to forcibly move the UE.

In step S407, the UE 100 may move back to the allowed location on the flight path by referring to the message received in step S406. For example, the UE may move to a gNB2 200-4, which is an allowed base station, or a cell, based on the current location.

In step S408, the UE 100 may move to the gNB2 200-4, which is the allowed base station to request access, and may perform a handover procedure with the radio communication system (e.g., the AMF 300).

In step S409, the AMF 300 may transmit a message (e.g., an AMF event notify message) for reporting that the UE 100 has re-entered the UAS service area to the USS 600 when the procedure of handing over the UE to the gNB2 200-4 is successfully performed. The message may include alarm code information indicating re-entry and geographic location information corresponding to the cell and the base station currently accessed by the UE.

In step S410, the USS 600 identifying that the UE has re-entered the allowed flight path from the AMF 300 may transmit a warning release message (e.g., a Warning Released message) to the UE, thereby reporting that the UE 100 is currently on the normal flight path. The message may include current geographic location information about the UE and, if needed, newly configured flight plan information. When a new flight plan is configured, the USS 600 may transmit the newly configured flight plan information to the AMF 300 of the radio communication system.

Figure 5:
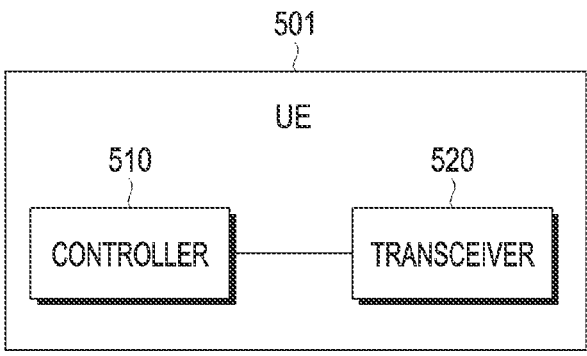
FIG. 5 illustrates a structure of a UE according to an embodiment.

FIG. 5 illustrates a structure of a UE according to an embodiment. As illustrated in FIG. 5, the UE 501 may include at least one controller (or processor) 510 and a transceiver 520 including a receiver and a transmitter. The UE 501 may include a memory. The transceiver 520 and the memory may be connected to the at least one controller 510 to operate under control of the at least one controller 510.

The at least one controller 510 may control operations of the UE described in FIG. 2 to FIG. 4 herein to be performed. The transceiver 520 may transmit and receive a signal to and from an AMF, a base station, and a USS.

Figure 6:
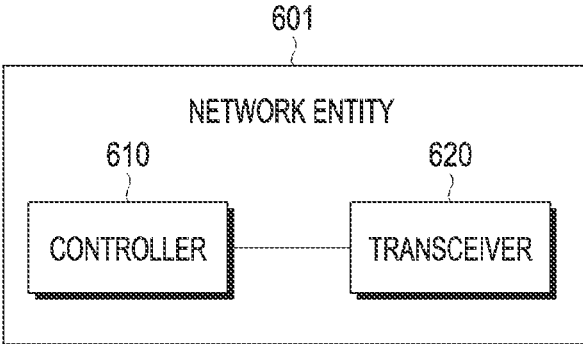
FIG. 6 illustrates a structure of a network entity (or network function (NF)) according to an embodiment.

FIG. 6 illustrates a structure of a network entity (or network function (NF)) 601 according to an embodiment. The network entity may include an AMF, a UDM, an NEF, a USS, an SMF, a UPF, an NWDAF, and the like. As illustrated in FIG. 6, the network entity 601 may include at least one controller (or processor) 610 and a transceiver 620 including a receiver and a transmitter. The network entity 601 may include a memory. The transceiver 620 and the memory may be connected to the at least one controller 610 to operate under control of the at least one controller 610.

The at least one controller 610 may control operations of the network entity described in FIG. 2 to FIG. 4 herein to be performed. The at least one controller 610 may include at least one processor. The transceiver 620 may transmit and receive a signal to and from the UE 501 and a base station 701.

Figure 7:
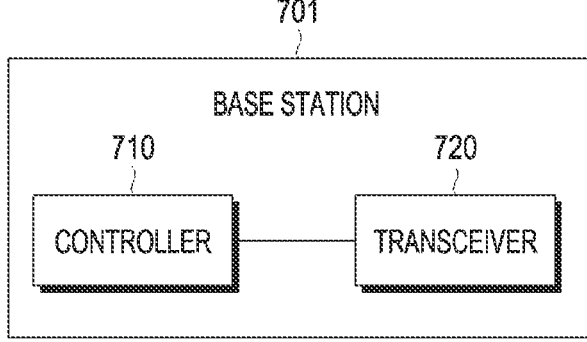
FIG. 7 illustrates a structure of a base station (RAN or gNB) according to an embodiment.

FIG. 7 illustrates a structure of a base station (RAN or gNB) according to an embodiment. As illustrated in FIG. 7, the base station 701 may include at least one controller (or processor) 710 and a transceiver 720 including a receiver and a transmitter. The base station 701 may include a memory. The transceiver 720 and the memory may be connected to the at least one controller 710 to operate under control of the at least one controller 710.

The at least one controller 710 may control operations of the base stations (RAN or gNB) described in FIG. 1 to FIG. 4 to be performed. The transceiver 720 may transmit and receive a signal to and from the UE 501 and the AMF.

Figure 8:
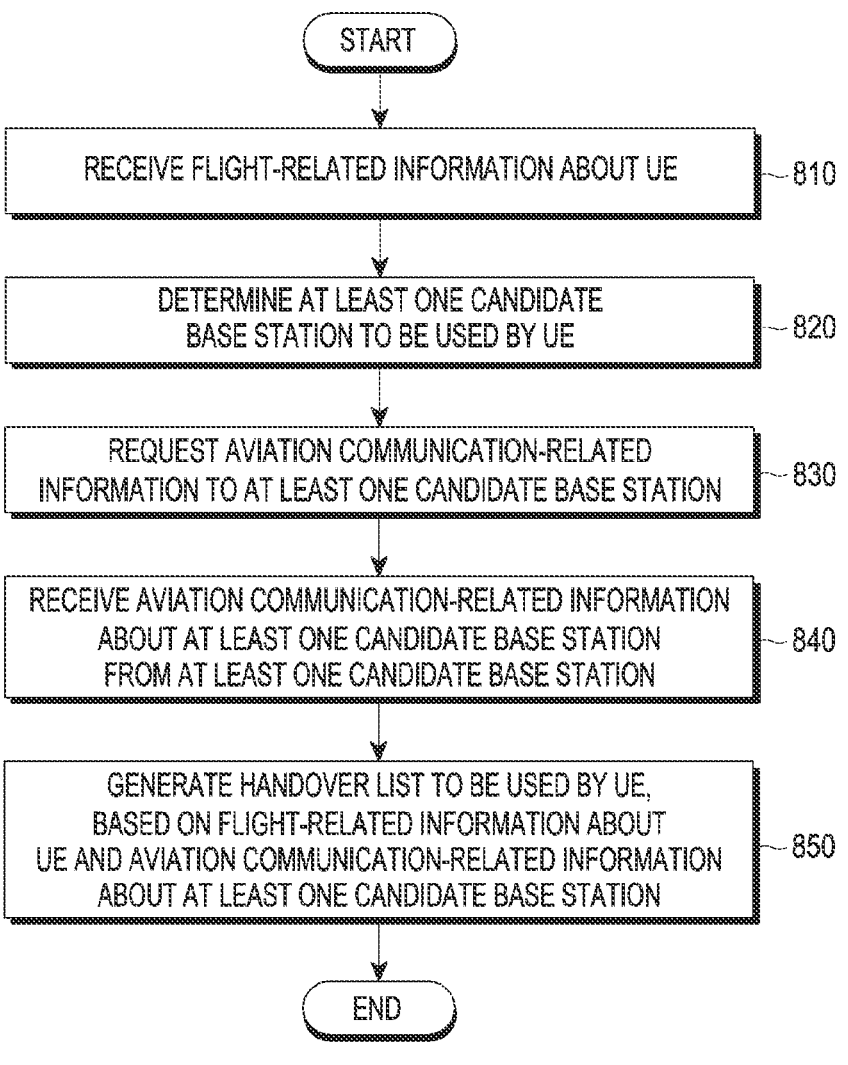
FIG. 8 is a flowchart illustrating a method of a network entity according to an embodiment.

FIG. 8 is a flowchart illustrating a method of a network entity according to an embodiment.

In FIG. 8, the network entity may correspond to AMF, USS, UDM, and NEF devices of FIG. 1 to FIG. 4, or may be one device including each device.

The network entity may receive flight-related information about a UE from a USS in step 810. The flight-related information about the UE may include at least one of location information about a flight departure point, location information about a flight arrival point, an estimated aviation communication start time, an estimated aviation communication end time, an estimated flight path, an estimated flight altitude, an estimated flight speed, location information about a major pass point, or an estimated time of a pass over the major pass point.

The network entity may determine at least one candidate base station to be used by the UE, based on the flight-related information about the UE (in step 820).

The network entity may transmit a request message for requesting aviation communication-related information about the at least one candidate base station to the at least one candidate base station in step 830.

The network entity may receive a response message including aviation communication-related information about the at least one candidate base station from the at least one candidate base station base station in step 840. The aviation communication-related information about the at least one candidate base station may include at least one of information indicating whether the at least one candidate base station supports aviation communication, information indicating whether at least one cell of the at least one candidate base station supports aviation communication, identifier information about the at least one candidate base station, or identifier information about the at least one cell of the at least one candidate base station.

The network entity may generate a handover list to be used by the UE, based on the flight-related information about the UE and the aviation communication-related information about the at least one candidate base station in step 850.

The network entity may transmit the handover list to the at least one candidate base station.

The network entity may transmit the handover list to the UE.

The network entity may receive information about whether the UE is capable of aviation communication from a unified data management (UDM).

Figure 9:
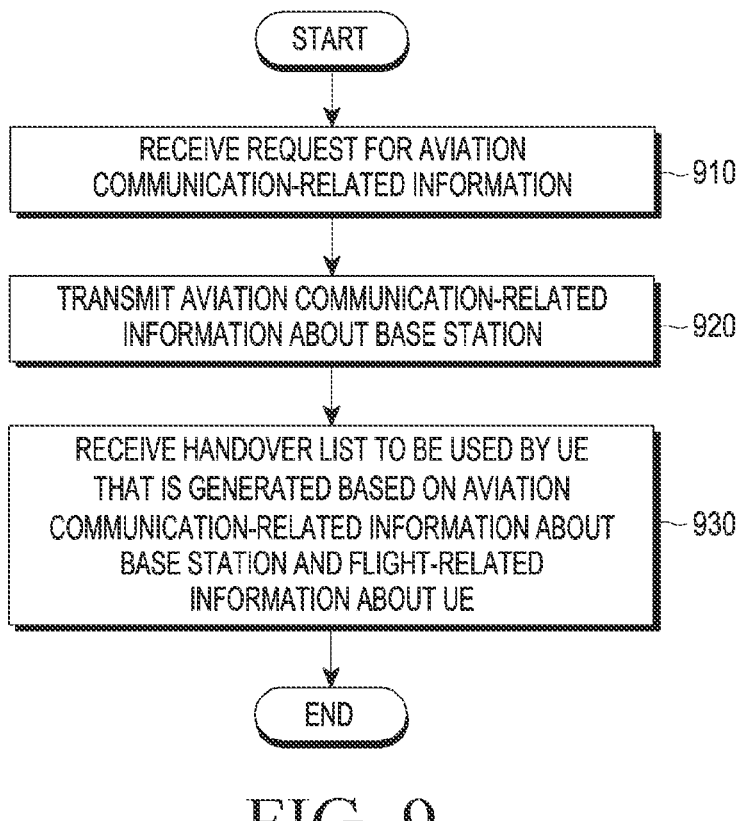
FIG. 9 is a flowchart illustrating a method of a base station according to an embodiment.

FIG. 9 is a flowchart illustrating a method of a base station according to an embodiment.

In FIG. 9, the base station may correspond to base station devices of FIG. 1 to FIG. 4.

The base station may receive a request message for requesting aviation communication-related information from an AMF in step 910.

The base station may transmit a response message including aviation communication-related information about the base station to the AMF 920. The aviation communication-related information about the base station may include at least one of information indicating whether the base station supports aviation communication, information indicating whether at least one cell of the base station supports aviation communication, identifier information about the base station, or identifier information about the at least one cell of the base station.

The base station may receive, from the AMF, a handover list to be used by a UE that is generated based on the aviation communication-related information about the base station and flight-related information about the UE in step 930. The flight-related information about the UE may include at least one of location information about a flight departure point, location information about a flight arrival point, an estimated aviation communication start time, an estimated aviation communication end time, an estimated flight path, an estimated flight altitude, an estimated flight speed, location information about a major pass point, or an estimated time of a pass over the major pass point.

The base station may transmit, based on the handover list, the handover list to a target base station when the UE performs a handover.

The embodiments of the disclosure described and shown herein and the drawings are merely examples that have been presented to easily explain the technical contents of the disclosure and help to understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, the respective embodiments of the disclosure may be partially combined to operate a base station and a terminal.

In the above-described detailed embodiments of the disclosure, an element included in the disclosure is expressed in the singular or the plural according to the presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Furthermore, the embodiments of the disclosure as described above are merely for the sake of illustration, and those skilled in the art will appreciate that various modifications and equivalent embodiments may be derived therefrom. Therefore, the true technical scope of protection of the disclosure should be defined by the appended claims.

While the present disclosure has been shown and described with reference to various embodiments of the present disclosure, those skilled in the art may appreciate that, without departing from the spirit and scope of the present disclosure as defined by the appended claims and their equivalents, variations may be made to the form and detail thereof.

What is claimed is:

1. A method performed by an access and mobility management function (AMF) in a wireless communication system, the method comprising:

receiving, from an uncrewed aerial system (UAS) service supplier (USS), via a network exposer function (NEF), a first message including first information on a planned flight route for a user equipment (UE) configured for at least one UAS service;

identifying whether the UE is flying in the planned flight route; and transmitting, to the USS, via the NEF, a notification message including second information on whether the UE is flying in the planned flight route in response to the identification, wherein the first message further includes third information indicating a request for a report for the second information on whether the UE is flying in the planned flight route, and wherein the first information on the planned flight route is related to a list of cells or a list of radio access node (RAN) node identifiers.

2. The method of claim 1, wherein the second information indicates whether the UE moves out of the area related to the panned flight route.

3. The method of claim 1, wherein the notification message further includes location information of the UE.

4. The method of claim 1, further comprising:

determining at least one candidate base station to be used by the UE, based on flight-related information for the UE received from the USS via the NEF;

transmitting, to the at least one candidate base station, a request message for requesting aviation communication-related information for the at least one candidate base station;

receiving, from the at least one candidate base station, a response message including the aviation communication-related information for the at least one candidate base station; and generating a handover list to be used by the UE, based on the flight-related information on the UE and the aviation communication-related information about the at least one candidate base station.

5. The method of claim 4, further comprising:

transmitting, to the at least one candidate base station, the handover list; and transmitting, to the UE, the handover list.

6. The method of claim 4, wherein the flight-related information on the UE further includes at least one of:

location information on a flight departure point, location information on a flight arrival point, an estimated aviation communication start time, an estimated aviation communication end time, an estimated flight route, an estimated flight altitude, an estimated flight speed, location information on a major pass point, or an estimated time of a pass over the major pass point.

7. A method performed by an uncrewed aerial system (UAS) service supplier (USS) in a wireless communication system, the method comprising:

transmitting, to an access and mobility management function (AMF), via a network exposer function (NEF), a first message including first information on a planned flight route for a user equipment (UE) configured for at least one UAS service; and receiving, from the AMF, via the NEF, a notification message including second information on whether the UE is flying in the planned flight route, wherein the first message further includes third information indicating a request for a report for the second information on whether the UE is flying in the planned flight route, and wherein the first information on the planned flight route is related to a list of cells or a list of radio access node (RAN) node identifiers.

8. The method of claim 7, wherein the second information indicates whether the UE moves out of the area related to the planned flight route.

9. The method of claim 7, wherein the notification message further includes location information of the UE.

10. An access and mobility management function (AMF) entity, in a wireless communication system, the AMF entity comprising:

a transceiver; and at least one processor coupled to the transceiver and configured to:

receive, from an uncrewed aerial system (UAS) service supplier (USS) entity, via a network exposer function (NEF) entity, a first message including first information on a planned flight route, identify whether the UE is flying in the planned flight route, and transmit, to the USS entity, via the NEF entity, a notification message including second information on whether the UE is flying in the planned flight routein response to the identification, wherein the first message further includes third information indicating a request for a report for the second information on whether the UE is flying in the planned flight route, and wherein the first information on the planned flight route is related to a list of cells or a list of radio access node (RAN) node identifiers.

11. The AMF entity of claim 10, wherein the second information indicates whether the UE moves out of the area related to the planned flight route.

12. The AMF entity of claim 10, wherein the notification message further includes location information of the UE.

13. An uncrewed aerial system (UAS) service supplier (USS) entity in a wireless communication system, the USS entity comprising:

a transceiver; and at least one processor coupled to the transceiver and configured to:

transmit, to an access and mobility management function (AMF) entity, via a network exposer function (NEF) entity, a first message including first information on a panned flight route for a user equipment (UE) configured for at least one UAS service, and receive, from the AMF entity, via the NEF entity, a notification message including second information on whether the UE is flying in the planned flight route, wherein the first message further includes third information indicating a request for a report for the second information on whether the UE is flying in the planned flight route, and wherein the first information on the planned flight route is related to a list of cells or a list of radio access node (RAN) node identifiers.

14. The USS entity of claim 13, wherein the second information indicates whether the UE moves out of the area related to the planned flight route.

15. The USS entity of claim 13, wherein the notification message further includes location information of the UE.

\* \* \* \* \*